US009396367B2

(12) United States Patent
Melville et al.

(10) Patent No.: US 9,396,367 B2
(45) Date of Patent: Jul. 19, 2016

(54) SYSTEM AND METHOD FOR SYNCHRONIZING RFID READERS UTILIZING RF OR MODULATION SIGNALS (71) Applicant: Amtech Systems, LLC, Albuquerque, NM (US)

(72) Inventors: Michael George Melville, Albuquerque, NM (US); Michael Paul Gonzales, Albuquerque, NM (US); Kelly Gravelle, Poway, CA (US)

(73) Assignee: Amtech Systems, LLC, Albuquerque, NM (US)

( * ) Notice: Subject to any disclaimer, the term of this patent is extended or adjusted under 35 U.S.C. 154(b) by 142 days.

(21) Appl. No.: 14/169,493

(22) Filed: Jan. 31, 2014

(65) Prior Publication Data
US 2014/0218175 A1   Aug. 7, 2014

Related U.S. Application Data (60) Provisional application No. 61/761,033, filed on Feb. 5, 2013, provisional application No. 61/775,328, filed on Mar. 8, 2013.

(51) Int. Cl.
*H04Q 5/22* (2006.01)
*G06K 7/10* (2006.01)
*G06K 7/016* (2006.01)
*G07B 15/06* (2011.01)

(52) U.S. Cl.
CPC .......... *G06K 7/10039* (2013.01); *G06K 7/016* (2013.01); *G06K 7/10475* (2013.01); *G07B 15/063* (2013.01)

(58) Field of Classification Search
CPC  G06K 7/016; G06K 7/10039; G06K 7/10475
See application file for complete search history.

(56) References Cited

U.S. PATENT DOCUMENTS

| | | |
|---|---|---|
| 4,511,887 A | 4/1985 | Fiore |
| 4,739,328 A | 4/1988 | Koelle et al. |
| 4,782,345 A | 11/1988 | Landt |
| 4,864,158 A | 9/1989 | Koelle et al. |
| 4,999,636 A | 3/1991 | Landt et al. |
| 5,030,807 A | 7/1991 | Landt et al. |
| 5,295,064 A | 3/1994 | Malec et al. |
| 5,485,520 A | 1/1996 | Chaum et al. |
| 5,504,485 A | 4/1996 | Landt et al. |
| 5,528,222 A | 6/1996 | Moskowitz et al. |
| 5,537,105 A | 7/1996 | Marsh et al. |
| 5,550,547 A | 8/1996 | Chan et al. |
| 5,581,249 A | 12/1996 | Yoshida |
| 5,604,486 A | 2/1997 | Lauro et al. |
| 5,606,322 A | 2/1997 | Allen et al. |

(Continued)

OTHER PUBLICATIONS

TransCore Newsroom, 1999 Archives, Sep. 27, 1999, "RFID and Bar Code in One Compact, Lightweight Intermec Scanner," http://transcore.com/newsroom/1999%20news/news990927.html.

(Continued)

*Primary Examiner* — Omeed Alizada
(74) *Attorney, Agent, or Firm* — Caesar Rivise, PC (57) ABSTRACT A system and method are disclosed for synchronizing two RFID readers. The system includes a modulation detector to detect a modulated signal produced by a first of the two reader and produces a synchronization signal. The second of the two readers initiates transmission of a signal in response to the synchronization signal.

2 Claims, 7 Drawing Sheets (56) References Cited

U.S. PATENT DOCUMENTS

| | | | |
|---|---|---|---|
| 5,606,323 A | 2/1997 | Heinrich et al. |
| 5,673,037 A | 9/1997 | Cesar et al. |
| 5,748,137 A | 5/1998 | d'Hont |
| 5,751,220 A | 5/1998 | Ghaffari |
| 5,802,105 A | 9/1998 | Tiedemann, Jr. et al. |
| 5,864,545 A | 1/1999 | Gonikberg et al. |
| 5,887,176 A | 3/1999 | Griffith et al. |
| 5,889,489 A | 3/1999 | Friedman et al. |
| 5,912,632 A | 6/1999 | Dieska et al. |
| 5,939,984 A | 8/1999 | Brady et al. |
| 5,940,006 A | 8/1999 | MacLellan et al. |
| 5,942,987 A | 8/1999 | Heinrich et al. |
| 5,943,617 A | 8/1999 | Nakamura |
| 5,952,940 A | 9/1999 | Matsumoto |
| 5,999,091 A | 12/1999 | Wortham |
| 6,078,251 A | 6/2000 | Landt et al. |
| 6,097,347 A | 8/2000 | Duan et al. |
| 6,107,910 A | 8/2000 | Nysen |
| 6,118,829 A | 9/2000 | North |
| 6,121,880 A | 9/2000 | Scott et al. |
| 6,169,474 B1 | 1/2001 | Greeff et al. |
| 6,219,543 B1 | 4/2001 | Myers et al. |
| 6,275,157 B1 | 8/2001 | Mays et al. |
| 6,381,269 B1 | 4/2002 | Gradl et al. |
| 6,476,708 B1 | 11/2002 | Johnson |
| 6,486,769 B1 | 11/2002 | McLean |
| 6,509,836 B1 | 1/2003 | Ingram |
| 6,529,488 B1 | 3/2003 | Urs et al. |
| 6,538,564 B1 | 3/2003 | Cole |
| 6,617,962 B1 | 9/2003 | Horwitz et al. |
| 6,677,852 B1 | 1/2004 | Landt |
| 6,734,797 B2 | 5/2004 | Shanks et al. |
| 6,735,426 B1 | 5/2004 | Pau |
| 6,856,802 B1 | 2/2005 | Kinnunen et al. |
| 6,946,950 B1 | 9/2005 | Ueno et al. |
| 6,975,228 B2 | 12/2005 | Wrasman et al. |
| 6,988,667 B2 | 1/2006 | Stewart et al. |
| 7,016,311 B2 | 3/2006 | Tiernay et al. |
| 7,075,412 B1 | 7/2006 | Reynolds et al. |
| 7,215,976 B2 | 5/2007 | Brideglall |
| 7,225,992 B2 | 6/2007 | Forster |
| 7,253,719 B2 | 8/2007 | Diorio et al. |
| 7,394,324 B2 | 7/2008 | Diorio et al. |
| 7,592,898 B1 | 9/2009 | Ovard et al. |
| 2001/0050922 A1 | 12/2001 | Tiernay et al. |
| 2006/0022800 A1* | 2/2006 | Krishna ............... G06K 7/0008 340/10.2 |
| 2006/0038659 A1* | 2/2006 | Takano ............... G06K 7/10356 340/10.51 |
| 2012/0280796 A1 | 11/2012 | Gravelle et al. |

OTHER PUBLICATIONS

TransCore Newsroom, 2002 Archives, Sep. 23, 2002 "TransCore's eGo Products Put Electronic Toll Collection and Vehicle Registration in High Gear," http://www.transcore.com/newsroom/2002%20news/news020921_2.html.

TC IP, Ltd., May 2003, "eGo Electronic Toll Collection and Electronic Vehicle Registration".

* cited by examiner

SYSTEM AND METHOD FOR SYNCHRONIZING RFID READERS UTILIZING RF OR MODULATION SIGNALS

CROSS-REFERENCE TO RELATED APPLICATIONS

This is utility application claims the benefit under 35 U.S.C. 119(e) of provisional application Ser. No. 61/761,033 filed on Feb. 5, 2013 entitled "System and Method for Synchronizing RFID Readers Utilizing RF or Modulation Signals" and on provisional application Ser. No. 61/775,328 filed on Mar. 8, 2013 and entitled "System and Method for Synchronizing RFID Readers Utilizing RF or Modulation Signals."

FIELD OF THE INVENTION

The invention relates generally to the field of RFID.

BACKGROUND

In the field of radio frequency identification (RFID), where multiple transponder interrogators (readers) are present is a limited area, it is sometimes necessary to synchronize the readers is to reduce or eliminate interference from one reader onto another reader or from two readers onto a transponder. By synchronizing the readers both readers can communicate with transponders in a way that both readers to communicate with their respective transponders without interfering with each other's signals.

DESCRIPTION

DETAILED SPECIFICATION

This invention consists of a method for using a signal (either at RF or baseband) to synchronize in time two or more RFID readers, and to minimize interference among a group of reader using time and frequency multiplexing. The reason to synchronize the readers is to reduce or eliminate interference from one reader onto another reader or from two readers onto a transponder. By synchronizing the readers both readers can communicate with transponders in a way that allows both readers to communicate with their respective transponders without interfering with each other's signals. Adding frequency multiplexing to additional groups of readers will allow this configuration to exist in areas with multiple readers such as a toll plaza with multiple traffic lanes.

Figure 1:
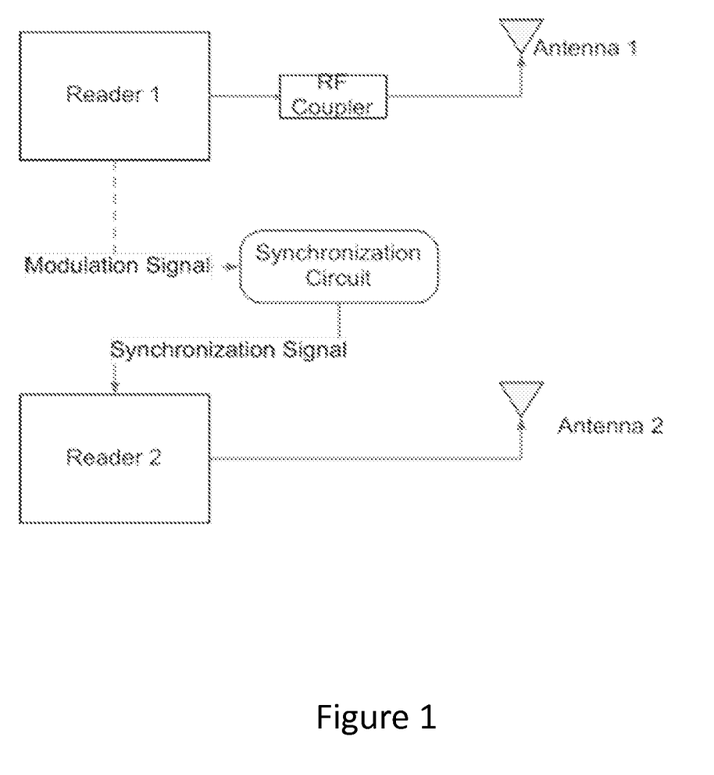
FIG. 1 is a diagram of an exemplary Block Diagram Single RFID system with two readers.
Figure 2:
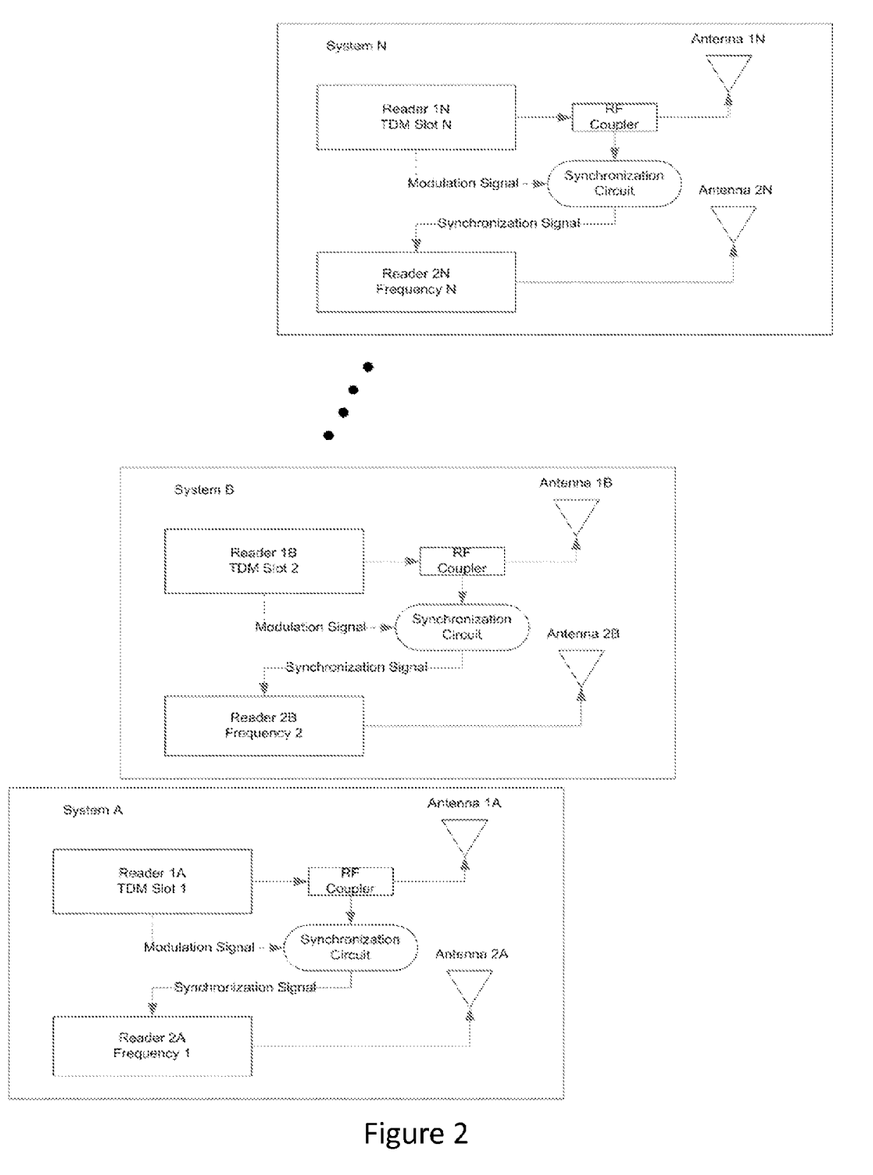
FIG. 2 is an exemplary Multi System Block Diagram.
Figure 3:
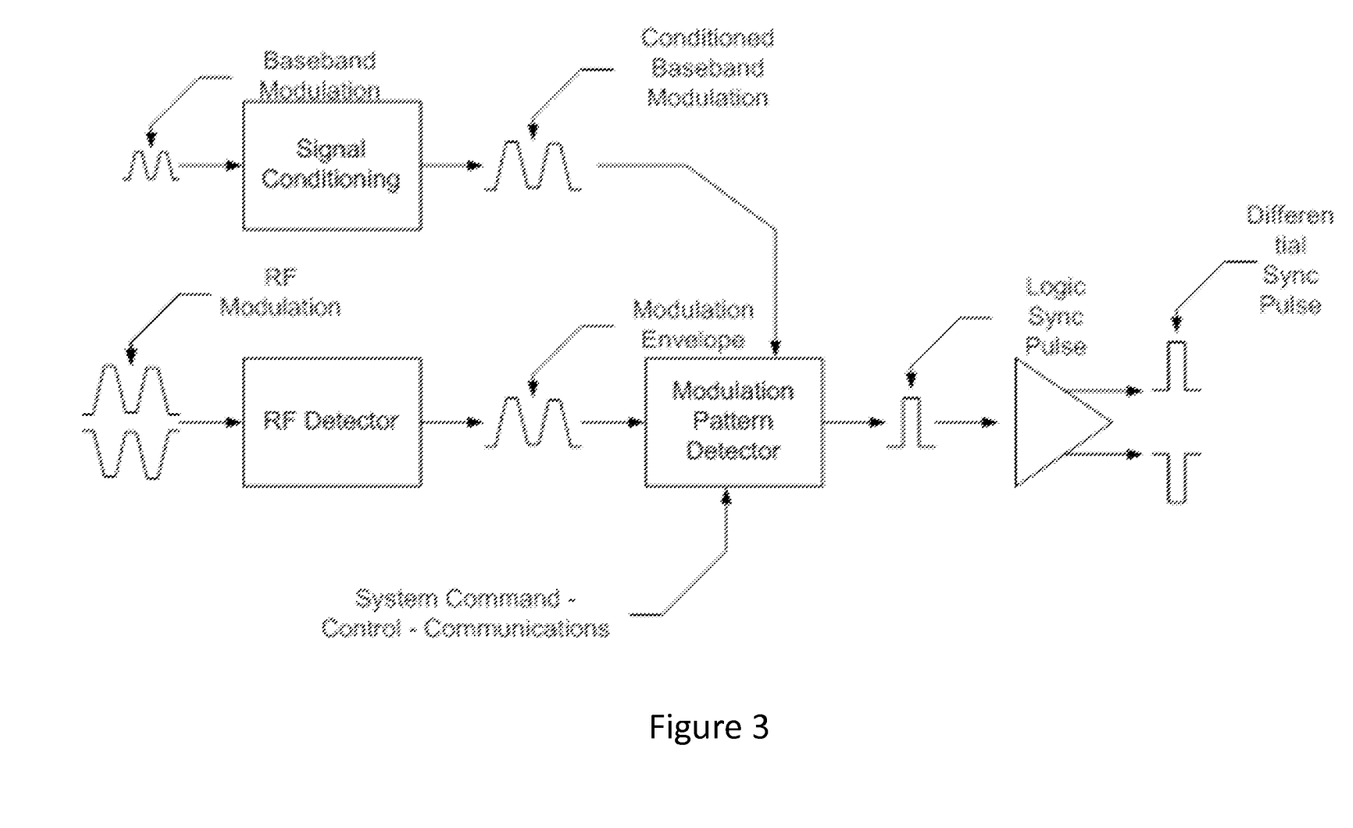
FIG. 3 is an exemplary Synchronization Circuit Diagram

An exemplary synchronization circuit looks for specific patterns in the RF or modulation signal from reader 1. The patterns are based on the transponder protocol reader 1 is using to communicate. Once the synchronization circuit detects the pattern, the circuit generates a signal or pulse that is sent to reader 2. This indicates that reader 1 is in the process of transmitting a command. Reader 2 uses that pulse to know when reader 1 is communication with a transponder. FIG. 2 shows the synchronization circuit using a coupler to supply the RF signal from reader 1. The dashed line for the modulation signal shows an alternate input to the synchronization circuit. If a baseband modulation signal is available from reader 1 that modulation signal could be used as an input to the synchronization circuit. FIG. 3 shows a circuit diagram of what is contained in the synchronization circuit. The synchronization circuit takes in either an RF or baseband modulation signal, detects a particular pattern in that RF or modulation signal, and then generates a pulse to create a signal that is synchronized in time with the input RF or modulation signal.

The synchronization circuit does not have to be an external circuit. Reader 2 could be modified to look at the RF output or modulation signal of reader 1 to detect the modulation from reader 1 to generate a synchronization signal.

System Time Domain and Frequency Multiple Access Plan

To maximize efficiency, different reader/transponder systems may need to use different multiple access schemes. As an example, in RFID tolling systems active transponders all use the same frequency to communicate from transponder to reader. These active transponders need to use separate time slots to minimize interference among readers. Backscatter or passive transponders use different RF frequencies to minimize interference among readers. This invention combines the synchronization method above with the concept of using time slots for appropriate protocols and separate frequencies for other protocols to minimize interference and other deleterious effects like cross-lane reads.

FIG. 2 shows a system that combines both time and frequency multiple access methods. In the diagram reader 1 in each system uses different time slots for multiple access. Reader 1 in each system use a separate time slot to allow the transponders responses to be received only by the appropriate reader. In practical configurations time slots may be reused after an acceptable physical separation between readers on the same time slot. For example toll systems have been configured with four time slots so that readers on the same time slot are separated by five traffic lanes. Reader 2 in each system is configured on separate frequencies from reader 2 in the other systems. This frequency separation allows readers to operate in overlapping time slots, but still have acceptable interference rejection by using different frequencies. As an example systems have been configured with frequencies of 902.25, 902.75, 903.25, and 903.75 MHz to operate on toll roads with backscatter transponders. As with time multiplexing, with enough physical separation frequencies can be reused.

Example 1

(Pair of Readers) Delay Eliminate RF Overlap Between Readers

Figure 4:
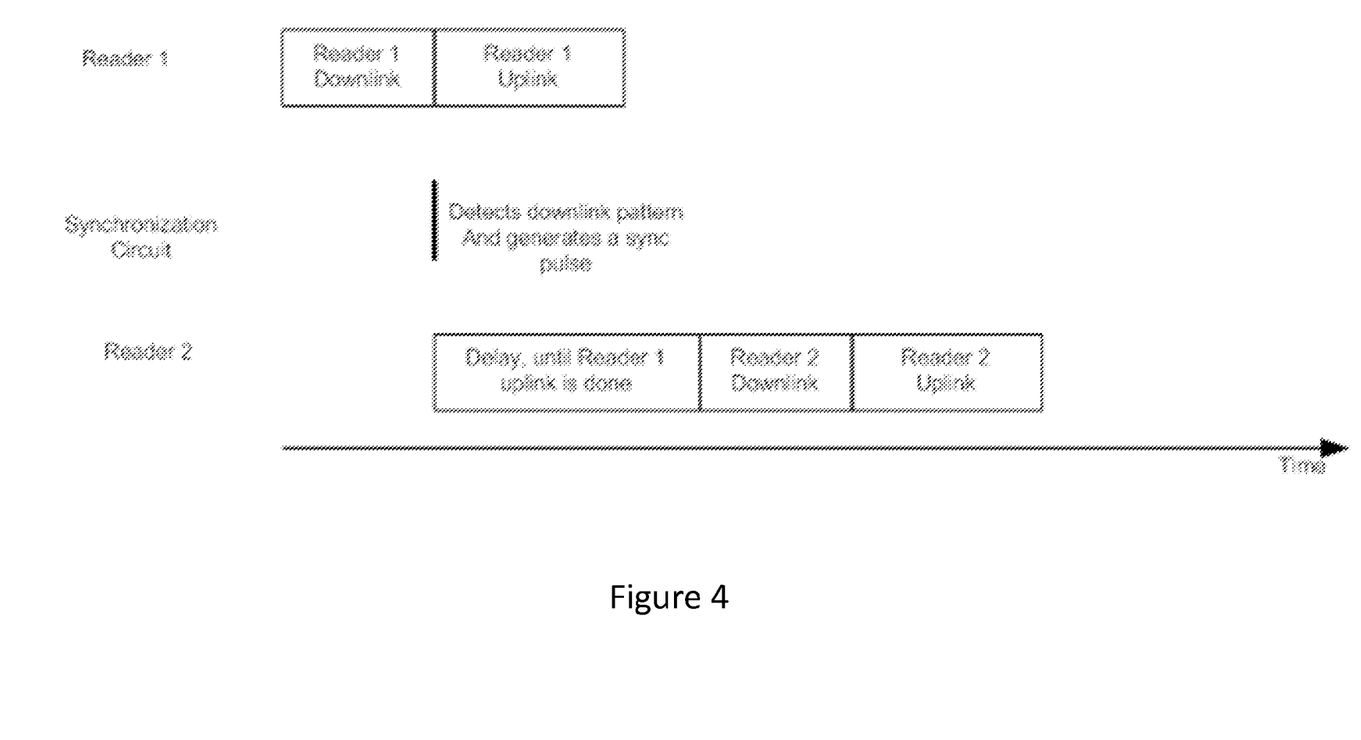
FIG. 4 is a timing diagram of a synchronization method including a delay.

With respect to the timing diagram in FIG. 4, Reader 2 uses the synchronization signal to start a timer. The timer is of sufficient duration to allow reader 1 to complete the communication process. Once the timer in reader 2 is finished reader

Example 2

(Pair of Readers) No Delay Eliminate Downlink on Uplink Interference

Figure 5:
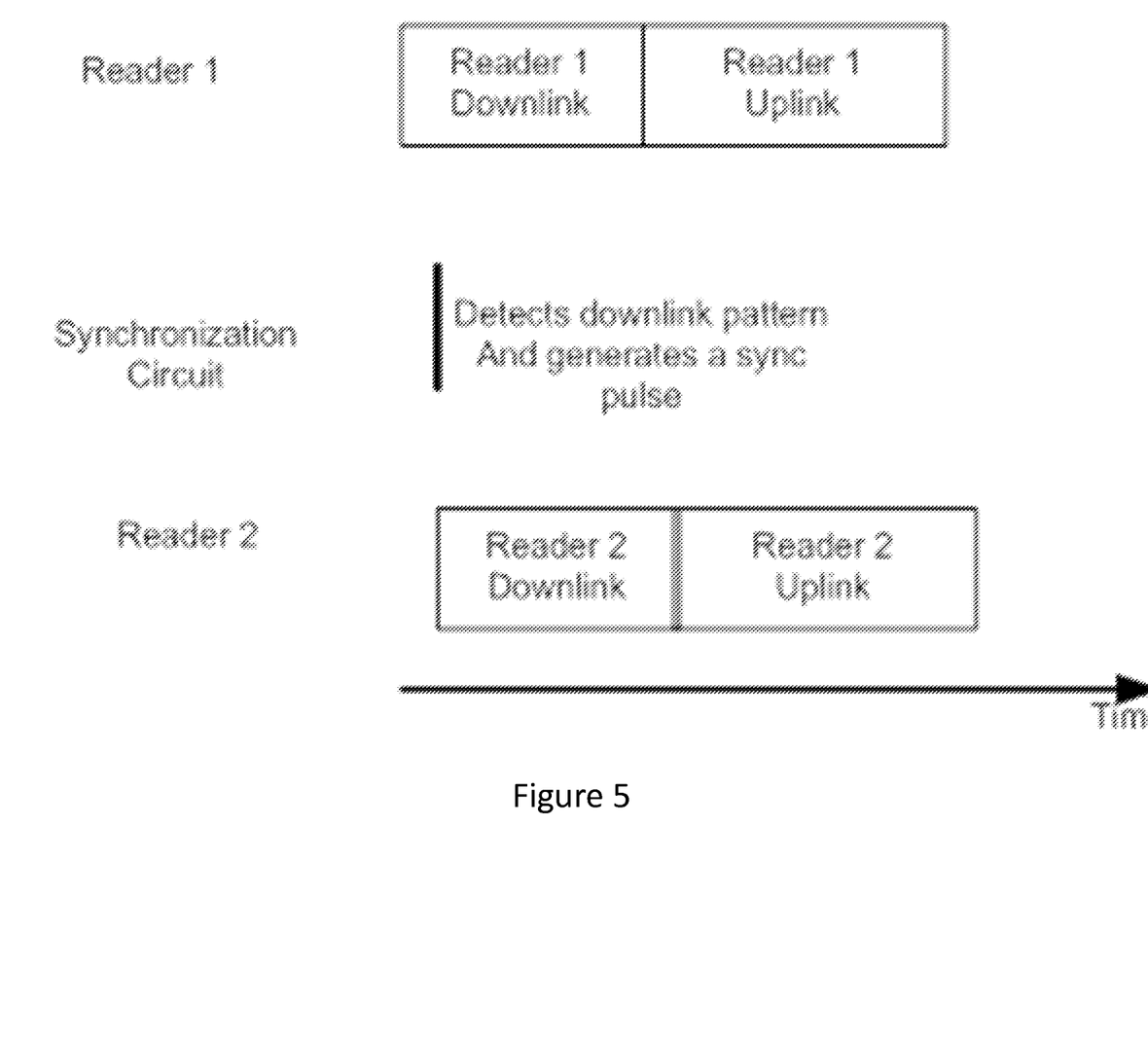
FIG. 5 is a timing diagram of a synchronization method without a delay.

With respect to the timing diagram in FIG. 5, Reader 2 uses the synchronization signal to immediately start modulation. Reader 2's modulation will be finished before reader 1's transponder begins to reply to reader 1's command. This will eliminate reader on reader interference when a reader is trying to detect a transponder.

Example 3

(Pair of Readers) Synchronization and Frequency Detection

Figure 6:
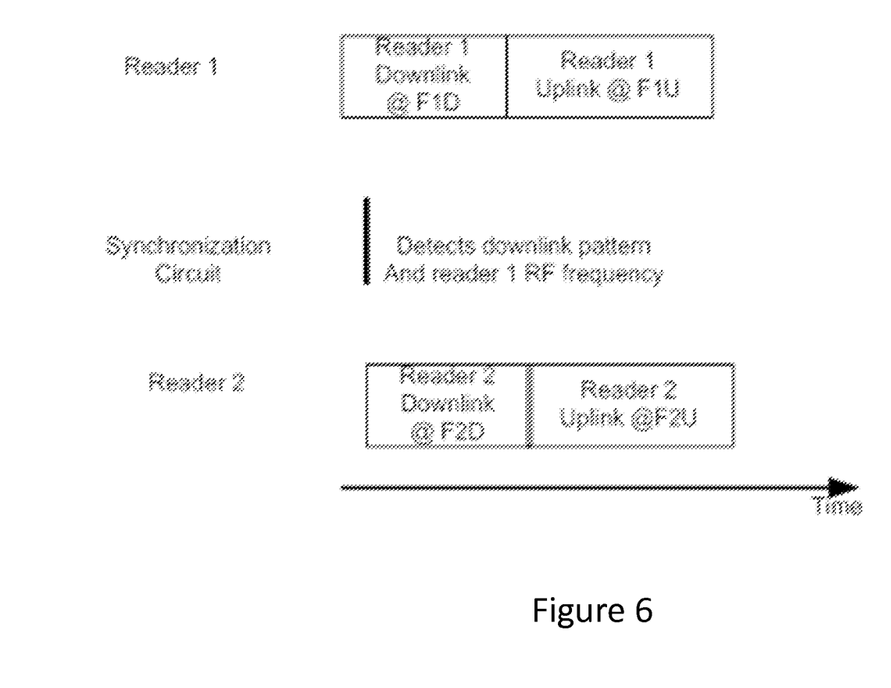
FIG. 6 is a timing diagram where reader are synchronized and use different frequencies to avoid interference.

With respect to FIG. 6, the synchronization circuit detects the modulation pattern and the RF frequency of reader 1. This allows reader 2 to use a frequency that is out of band from reader 1 helping to minimize any interference between reader 1 and reader 2.

Example 4

Multiple Pairs of Readers

Figure 7:
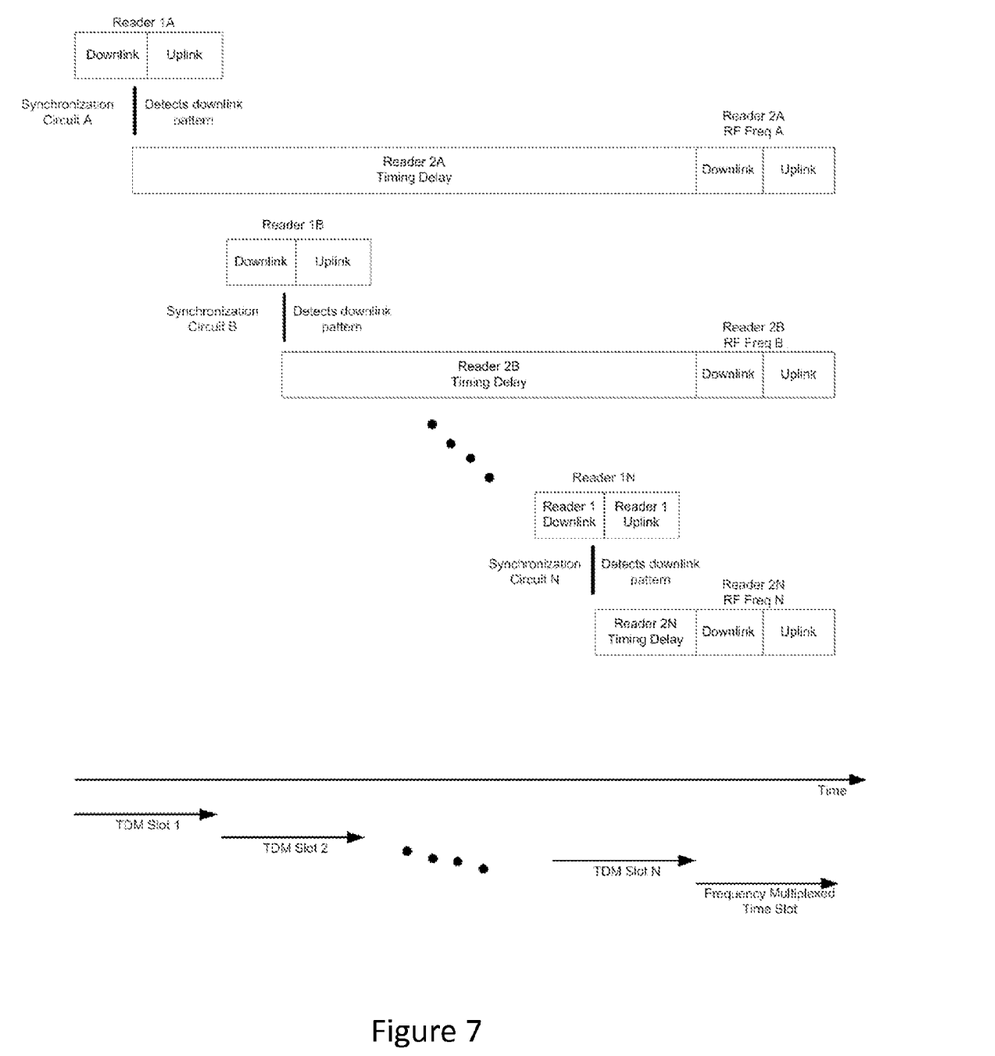
FIG. 7 is a timing diagram for systems having multiple pairs of readers.

In this example each of the synchronization circuits detects the modulation of reader 1. Reader 2 uses the output of the synchronization circuit to start a delay. The delay for each pair of readers is different, but allows the RF from each of the reader 2s in the diagram to operate simultaneously. The RF frequency for each of the reader 2s in the diagram is different. This allows the group of reader 1s to operate with TDM and the group of reader 2s to operate with FDM. This diagram shows that all of the readers 2s are operating at the same time on different frequencies. This is not the only configuration that could be used. Each of the reader 2s do not have to be aligned in time. The reader 2s in the diagram could each operate at different times as long as they did not interfere with the operation of the reader is in their group.

The invention claimed is:

1. A system for communicating with RFID transponders comprising
   a subsystem A, comprising
   a first sub-system A RFID reader;
   a second subsystem A RFID reader in relative proximity to said first sub-system A RFID reader;
   said second subsystem A RFID reader comprising a subsystem A modulation detection circuit for detecting a modulated signal from said first subsystem A RFID reader,
   a subsystem B, comprising
   a first sub-system B RFID reader;
   a second subsystem B RFID reader in relative proximity to said first sub-system B RFID reader, said first subsystem A RFID reader and said second subsystem A RFID reader;
   said second subsystem B RFID reader comprising a subsystem B modulation detection circuit for detecting a modulated signal from said first subsystem B RFID reader,
   wherein
   said subsystem A modulation detection circuit produces a trigger signal after which said second subsystem A RFID reader transmits a signal and
   said subsystem B modulation detection circuit produces a trigger signal after which said second subsystem B RFID reader transmits a signal, wherein said first subsystem A RFID reader and said first subsystem B RFID reader operate in different predetermined time slots, said different predetermined time slots having no temporal reference to said trigger signals, wherein said second subsystem A RFID reader delays its trigger signal by a second subsystem A delay and said second subsystem B RFID reader delays its trigger signal by a second subsystem B delay and wherein said second subsystem A delay and said second subsystem B delay are of different lengths and wherein said second subsystem A delay and said second subsystem B delay are configured to produce said trigger signals in subsystem A and subsystem B at substantially the same real time.

2. The system of claim 1, wherein said second subsystem a RFID reader and said second subsystem b RFID reader operate at different frequencies.

* * * * *